Figures 1, 2:
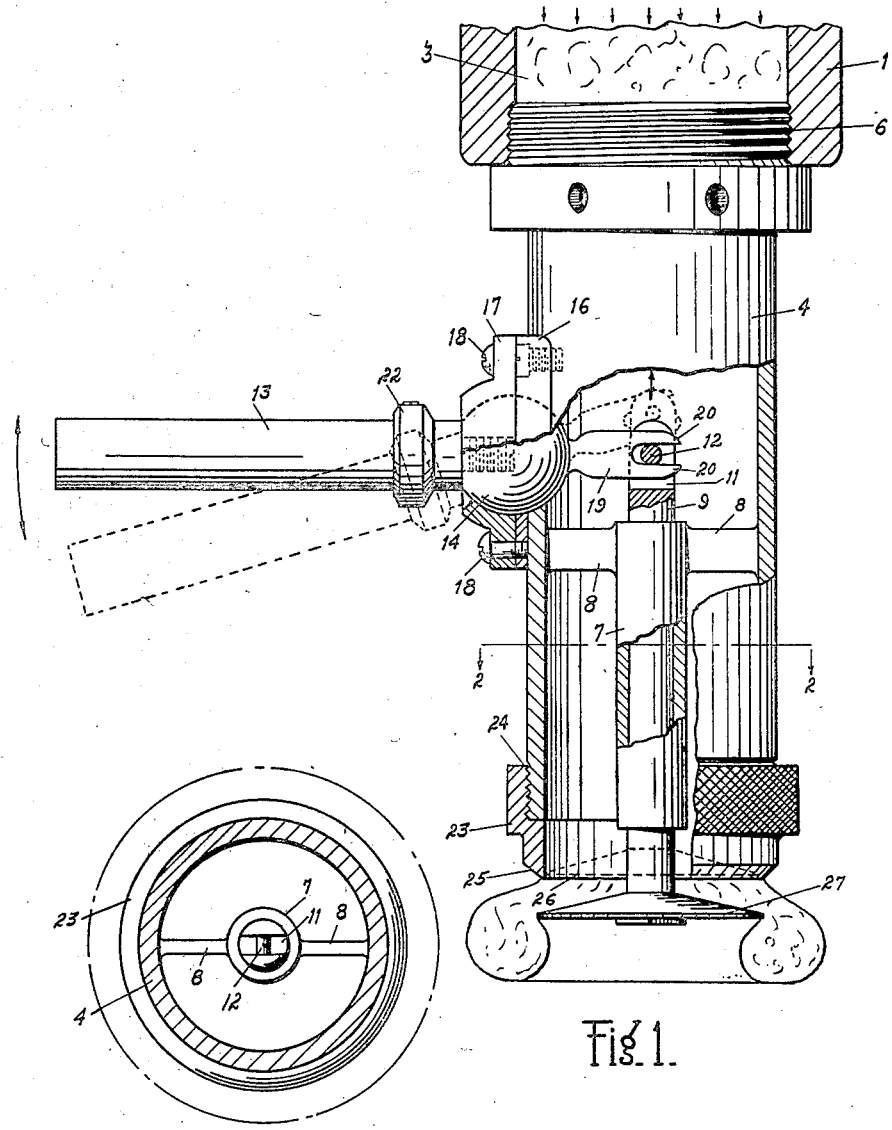

Oct. 27, 1931.  P. J. TOEWS  1,829,120
DOUGH FORMER
Filed July 22, 1930

INVENTOR.
PETER J. TOEWS.
BY *Philip S. Hopkins*
ATTORNEY.

UNITED STATES PATENT OFFICE

PETER J. TOEWS, OF NEW YORK, N. Y.

DOUGH FORMER

Application filed July 22, 1930. Serial No. 469,701.

This invention relates to method and means for shaping plastics and more particularly to a method and apparatus for ejecting dough and thereby forming doughnuts.

An object of this invention is to transform a body of plastic material into a plurality of separate pieces of substantially the same size and shape.

Another object of this invention is to alternately extrude and cut off substantially equal portions of plastic material from a body thereof.

Another object of this invention is to extrude dough from a tube and to periodically cut off the extruded dough from the main body thereof.

Still another object of this invention is to form doughnuts in large quantity in a convenient and economical manner.

In the past it has been customary to form plastic materials such as dough into individual pieces by rolling the material into the form of a flat cake of the desired thickness and then cutting out pieces of the desired shape. The excess material is again rolled or added to a succeeding batch of the plastic material. An alternative method is to force the plastic material into moulds or forms of the desired shape and size. Neither of these methods is well adapted to economical quantity production.

This invention contemplates method and means for forming similar pieces of plastic material in large quantities by continuously feeding the plastic material to forming means capable of operating at high speed, without waste and with no rehandling of the plastic material. The body of plastic material may be enclosed and therefore kept free of foreign matter. The feeding and forming means are arranged for quick and easy cleaning. Other objects and advantages of this invention will be apparent as the description proceeds.

The foregoing objects and advantages are realized by providing means for holding a quantity of plastic material, means for feeding or guiding the material to an orifice, and means for alternately opening and stopping the orifice so that the portion of the plastic material which passes through the orifice while it is open is cut off from the remainder of the material when the orifice is closed. The stopping means may also serve to form the cut off portion to the desired shape.

The novel features which are believed to be characteristic of this invention are set forth with particularity in the appended claims. The invention itself, however, will best be understood by reference to the accompanying drawings in which:

Figure 1 is a side view of a dough ejector according to this invention, the device being shown partly in section for clearness, and Figure 2 is a cross section of the device shown in Figure 1 at line 2—2.

Referring now to Figure 1, reference character 1 indicates the lower portion of a receptacle, of any convenient size, shape or material, adapted to hold therein a plastic material such as dough, indicated by reference character 3. A tubular member 4 is removably attached to receptacle 1 as by a screw thread 6. Members 1 and 4 may be connected directly or by a convenient coupling device, provided that the interior of receptacle 1 communicates with the interior of member 4, so that the dough 3 may readily pass from the former to the latter. Inside member 4 a guide or bearing 7 is secured thereto in such manner as to obstruct the interior of tube 4 as little as possible, as by webs 8. Member 7 serves as a guide and bearing for a rod 9 which is adapted to move up and down therein. Rod 9 is bifurcated at one end by slot 11 (Figure 2) and has a pin 12 secured thereto, bridging the slot 11.

An actuating member 13 having a partly spherical portion 14 is mounted in the wall of tubular member 4. A mounting plate 16 is secured to the outside of tube 4 or may form an integral part thereof, and a cover plate 17 is removably attached to plate 16 as by screws 18. The wall of tube 4 and plates 16 and 17 are provided with aligned apertures shaped to fit spherical portions 14 and provide a combined bearing and stuffing box for actuating member 13 whereby member 13 may be rotated in said bearing, but the dough in tube 14 is prevented from leaking out except in negligible quantity. The dividing plane between plates 16 and 17 passes through the center of spherical surface 14 so that parts 13, 16, 17 and 4 may be readily separated. Spherical member 14 may be integral with member 13 or may be secured thereto in any suitable manner. A bifurcated member or yoke 19 is secured to or is integral with the portion of member 14 which extends into tube 4. Yoke 19 is disposed in slot 11 in the upper end of shaft 9 and the legs 20 thereof are disposed on opposite sides of pin 12 so that, when the outer end of actuating member 13 is depressed, rod 9 is raised with respect to tube 4 and vice versa. Member 13 may be provided with a removable collar 22 to prevent oil or grease which may be present from creeping along member 13 and entering tube 4. Collar 22 also serves to remove dough which leaks out of tube 4.

To the lower end of tube 4 is attached an orifice member or nozzle 23 as by screw thread 24. The open lower end of tube 4 could serve as an orifice but it is preferable to provide the detachable member 23 which may be easily repaired or replaced without disturbing other parts of the apparatus. The diameter of the orifice 26 is shown in Figure 1 to be substantially equal to the inside diameter of tube 4 but it may be smaller or larger as desired. The outer surface of nozzle 23 may be knurled as an aid in turning it on thread 24. The lower end of nozzle 23 is beveled as indicated at 25, to provide a sharp edge at the orifice 26. Stopping means or valve 27 is secured by any suitable means to the lower end of rod 9 or it may be integral therewith. Valve 27 may be thickened at the center and tapered toward the edge so that its surface will assist in guiding the plastic material to the annular opening between plate 27 and nozzle 23. Plate 27 may butt against the edge of orifice 26 but it is preferable to shape the edge of valve 27 so that it will enter orifice 26 with small clearance.

When lever 13 is in a horizontal position as shown in Figure 1, valve member 27 is spaced from the end of orifice member 23 and the plastic material or dough flows through the opening therebetween and curls around the edge of valve 27. When the desired quantity of dough has been ejected a mechanism (not shown) depresses lever 13 thereby lifting rod 9 and therefore valve 27 until it comes into contact with or enters orifice member 23. The edges of valve 27 and orifice 26 shear the plastic material and the portion thereof which has passed through the orifice 26 drops off. If orifice 26 and valve 27 are circular, which is the preferred form, the cut off portion of dough will be a ring of the customary doughnut shape. For each cycle of lever 13 a doughnut is formed. The dough may be fed through tube 4 by gravity or may be forced through by pressure in receptacle 1. It is apparent that a dough ejector as shown in Figure 1 may be easily and quickly taken apart for cleaning and sterilizing the parts and for regrinding the edges.

While this invention has been illustrated and described in one of its preferred embodiments, it should be understood that the invention itself is limited only by the scope of the appended claims.

I claim:

1. In combination, a receptacle, a tube attached to an outlet of said receptacle and communicating therewith, a guide secured within said tube, a rod reciprocally movable in said guide and carrying a valve adapted to open or close an end of said tube according to the position of said rod, and an actuating lever pivotally mounted laterally with respect to said tube, extending into and operatively connected with said rod within said tube.

2. A dough ejector comprising a receptacle for dough, a tube attached to said receptacle and communicating at one end with the interior thereof, a nozzle attached to the opposite end of said tube having a sharp edged orifice, a valve adapted to enter said orifice with small clearance, and means, partly disposed within said tube for moving said valve into and out of said orifice, whereby said dough is permitted to flow through said orifice or is cut off by said valve according to the position of said valve relative to said orifice, said moving means comprises a rod attached at one end to said valve and movable in a guide within said tube, and an actuating lever for said rod and valve operatively connected to the other end of said rod, said lever being provided with a ball and socket mounting in the wall of said tube.

In testimony whereof, I affix my signature.

PETER J. TOEWS.